United States Patent [19]

Parks

[11] 4,353,660

[45] Oct. 12, 1982

[54] BALL JOINT ASSEMBLY

[75] Inventor: Kevin Parks, South Bend, Ind.

[73] Assignee: The Bendix Corporation, Southfield, Mich.

[21] Appl. No.: 183,653

[22] Filed: Sep. 2, 1980

[51] Int. Cl.³ .................. F16B 3/00; F16C 11/00; F16D 1/12
[52] U.S. Cl. ........................... 403/132; 403/140; 403/135
[58] Field of Search ............... 403/140, 133, 132, 131, 403/130, 135, 76, 77, 90

[56] References Cited

U.S. PATENT DOCUMENTS

| | | | |
|---|---|---|---|
| 3,389,927 | 6/1968 | Herbenar | 403/140 |
| 3,647,249 | 3/1972 | Baba et al. | 403/140 |
| 3,679,248 | 7/1972 | Herbenar | 403/140 |
| 3,967,907 | 7/1976 | Schmidt | 403/140 X |
| 4,283,833 | 8/1981 | Pyles | 403/140 X |

Primary Examiner—Wayne L. Shedd
Attorney, Agent, or Firm—Paul David Schoenle; Ken C. Decker

[57] ABSTRACT

A ball joint assembly includes a ball stud (10) which is received within a bearing (14) for attachment to a socket (18). The bearing (14) is provided with a plurality of grooves (38) and ridges (40). The ridges form an interference fit with the socket (18) to preload the ball joint assembly.

3 Claims, 3 Drawing Figures

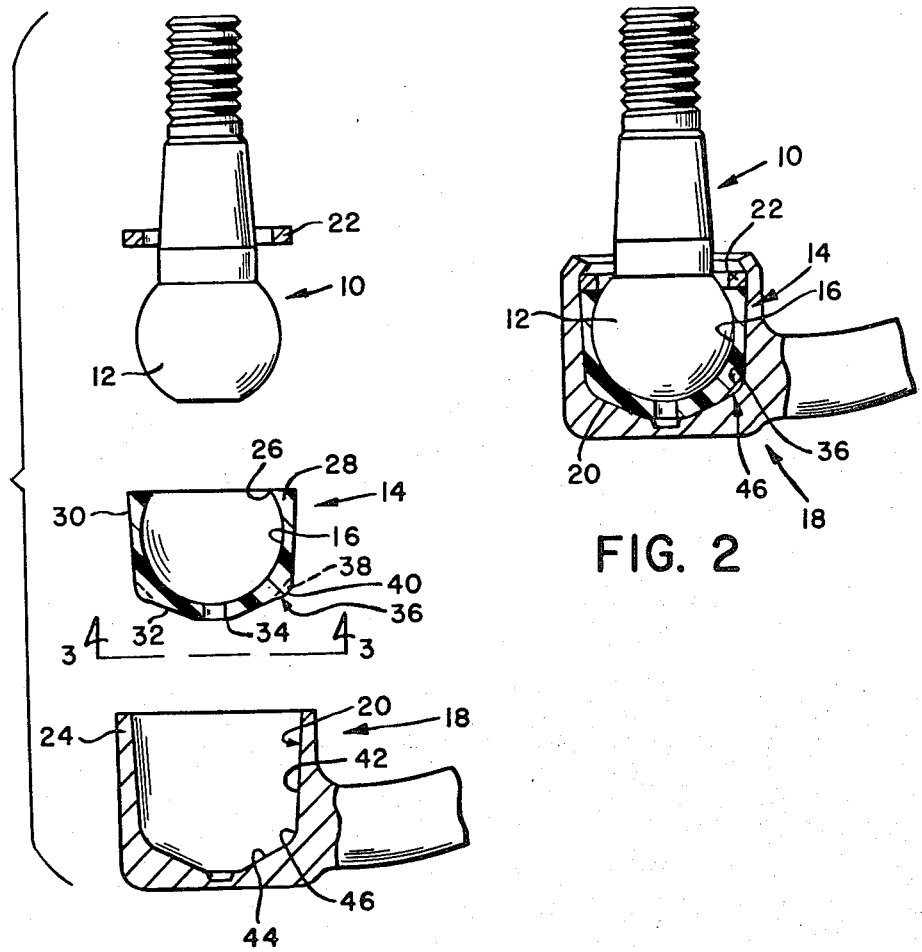
FIG. 2
FIG. 1
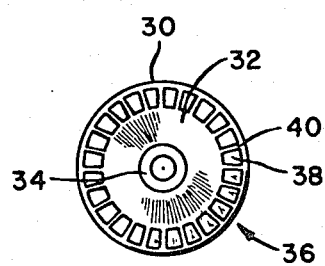
FIG. 3

BALL JOINT ASSEMBLY

The invention relates to a ball joint assembly wherein a socket is provided with an opening for receiving a bearing and the spherical end of a ball stud. The ball stud is universally disposed within the socket opening to permit universal pivoting of the ball stud relative to the bearing and socket. Common applications for such a ball joint assembly are found in automotive suspension systems wherein a wheel assembly is connected to a support member by means of a ball joint assembly.

Due to the forces imparted from the ball stud to the socket, and vice versa, the bearing is subjected to substantial compression forces so that after prolonged use the bearing sometimes becomes worn to introduce objectionable play between the ball stud and socket.

In order to overcome this wearing, or stretching, of the bearing, the prior art has suggested that the bearing should be preloaded within the socket. In order to preload the bearing within the socket opening, the outer dimension of the bearing is larger than the inner dimension of the socket opening. Consequently, the bearing must be press-fitted into the socket opening to compress the bearing between the ball stud and socket. As a result, the bearing is uniformly preloaded over substantially its entire length. Because the dimensions of the ball stud, bearing and socket control the amount of preload for the bearing, it is important to maintain close tolerances, or else manufacturing variations in these tolerances will cause different preloads for similar ball joint assemblies.

The prior art is illustrated in U.S. Pat. No. 3,389,972.

The present invention provides an improvement for the foregoing described ball joint assembly. The bearing of the invention herein is made from a thermo plastic mateial and is provided with an intermediate outer surface portion which defines an interference fit with a matching portion of the socket opening. First and second outer surface portions of the bearing adjoining the intermediate portion are substantially identical in dimension to matching portions of the socket opening. The intermediate portion is provided with a plurality of grooves cooperating with the bearing to form a plurality of ridges therebetween. When the ball stud and bearing are fitted into the socket opening, the plurality of ridges are deformed to impart a preload to the bearing at a predetermined location where the forces are substantially concentrated when the ball stud imparts movement to the socket, and vice versa.

An advantage gained from the invention is that only the intermediate portion need be modified to control the preload on the bearing, rather than modifying the bearing over its entire length within the socket. The intermediate portion is also susceptible to several methods of modification to control the preload. For example, it is possible to reduce the number of ridges, to alter the shape of the ridges, or to reduce the dimension of the ridges in order to vary the preload desired for the bearing.

One way of carrying out the invention is described in detail herein with reference to the drawings which illustrate only one embodiment.

FIG. 1 is an exploded view of a ball joint assembly made in accordance with the invention prior to assembly;

FIG. 2 is a side view, partly in cross-section, showing the ball joint assembly of FIG. 1 in its assembled condition; and FIG. 3 is a bottom view of the bearing of FIG. 1 shown along line 3—3 in FIG. 1.

In order to assemble the ball joint of the present invention, a ball stud 10 is provided with a spherical end 12. The ball stud is connected to a bearing 14, made preferably of a thermoplastic material, by fitting the spherical end within a spherical cavity 16 defined by the bearing. Next, the bearing 14 with its attached ball stud is fitted within a socket 18 having an opening 20. A retaining ring 22 is positioned over the end of the bearing receiving the ball stud 10 and a portion of the socket at one end 24 is turned inwardly to permanently retain the bearing within the socket opening 20.

The bearing 14 in FIG. 1 includes a first aperture 26 which is smaller in diameter than the diameter of the spherical end 12 of the ball stud. However, the elastic characteristics of the bearing 14 permit stretching or deformation of the end 28 to position the ball stud in the cavity 16. A first outer surface portion 30 is frusto conical in shape to taper inwardly from the end 28. A second outer surface portion 32 is also frusto conical in shape to taper outwardly from a bottom end 34 opposite end 28. In accordance with the invention an intermediate outer surface 36 is disposed between the first and second outer surfaces. The surface 36 is formed by a plurality of grooves 38 and ridges 40. FIG. 3 shows the grooves 38 and ridges 40 extending radially while FIG. 1 shows the grooves 38 and ridges 40 also extending axially.

The diameter of the first outer surface 30 varies along its length and is substantially identical to a matching first section 42 of socket opening 20. Similarly, the diameter of the second outer surface varies along its length and is substantially identical to a second section 44 of socket opening 20. An intermediate section 46 between the first and second sections of the wall of socket opening 20 is substantially arcuate to tangentially adjoint the sections 42 and 44. The diameter formed by the outer edges of the ridges 40 of the surface 36 varies along its length and is larger than the diameter of the intermediate section 46.

In the assembled condition of FIG. 2, the interference fit formed between the intermediate surface 36 and the intermediate section 46 causes the plurality of ridges to be elastically deformed thereby compressing the bearing 14 substantially along the length of the intermediate surface 36. Although there might exist a slight interference fit between the surface portions 30, 32 and the sections 42, 44, respectively, the majority of the preload imparted to the bearing is positioned over the intermediate surface. When the ridges 40 are deformed during assembly to fit against the intermediate section 46, the ridges expand transversely to take up some of the space defined by the plurality of grooves. The restoring force generated by this deformation of the ridges is transmitted through the bearing substantially at the intermediate surface. Consequently, the bearing is maintained in a press fit relation with the ball stud and socket substantially at the intermediate surface.

Preferably the thermoplastic bearing 14 will be molded within a die so that the die is provided with matching grooves and ridges to impart a plurality of ridges and grooves to the bearing during the molding operation. In the alternative, it is possible to enlarge the intermediate portion 36 and provide the ridges and grooves after the molding operation by impacting the intermediate portion against a tapered die plate having matching grooves and ridges. Also, the tapered die plate in the alternative operation would be heated to enhance material flow for the intermediate portion of the bearing.

I claim:

1. In a ball joint assembly having a socket with an opening leading to an inner surface on the socket, the inner surface having a predetermined contour of varying dimension, a bearing disposed within the opening, the bearing including a substantially spherical cavity leading to an aperture, and a ball stud disposed within the cavity and extending outwardly from the bearing via the aperture, the ball stud being attached to the bearing prior to the attachment of the bearing and ball stud to the socket, the ball stud defining an outer spherical surface substantially identical to the spherical cavity prior to fitting the ball stud in the cavity, and the bearing outer surface having a first portion and a second portion engageably cooperating with complementary portions of said predetermined contour for said socket inner surface, said bearing portions defining dimensions substantially equal to dimensions for said socket inner surface, characterized by said bearing outer surface defining an intermediate portion between said first and second portions and shorter in length than said first and second portions, said intermediate portin engageably cooperating with a complementary section of said socket inner surface and having a dimension greater than the dimension defined by the complementary section of said socket inner surface, said intermediate portion cooperating with said ball stud and said socket when the bearing and ball stud are fitted into said socket to preload said bearing, and said intermediate portion defining an interference fit with said socket inner surface to provide the majority of preload imparted to said bearing, whereby said bearing is defomed only by said intermediate portion to preload the entire bearing into tight engagement with said socket inner surface and said ball stud.

2. The ball joint assembly of claim 1 further characterized by said intermediate portion including a plurality of grooves between a plurality of ridges, and said plurality of ridges extending outwardly from the outer surface of said first and second portions.

3. The ball joint assembly of claim 1 further characterized by said first and second portions substantially forming frusto conical outer surfaces and said intermediate portion adjoining said first and second portions and substantially defining an arcuate outer surface extending between said first and second portions.

* * * * *